No. 650,816. Patented June 5, 1900.
C. E. BELCHER.
MOTOR VEHICLE.
(Application filed Dec. 21, 1899.)

(No Model.) 2 Sheets—Sheet 1.

Witnesses
C. H. Walker
J. W. Garner

Inventor
Cassius E. Belcher
By his Attorneys,
C. A. Snow & Co.

THE NORRIS PETERS CO., PHOTO-LITHO., WASHINGTON, D. C.

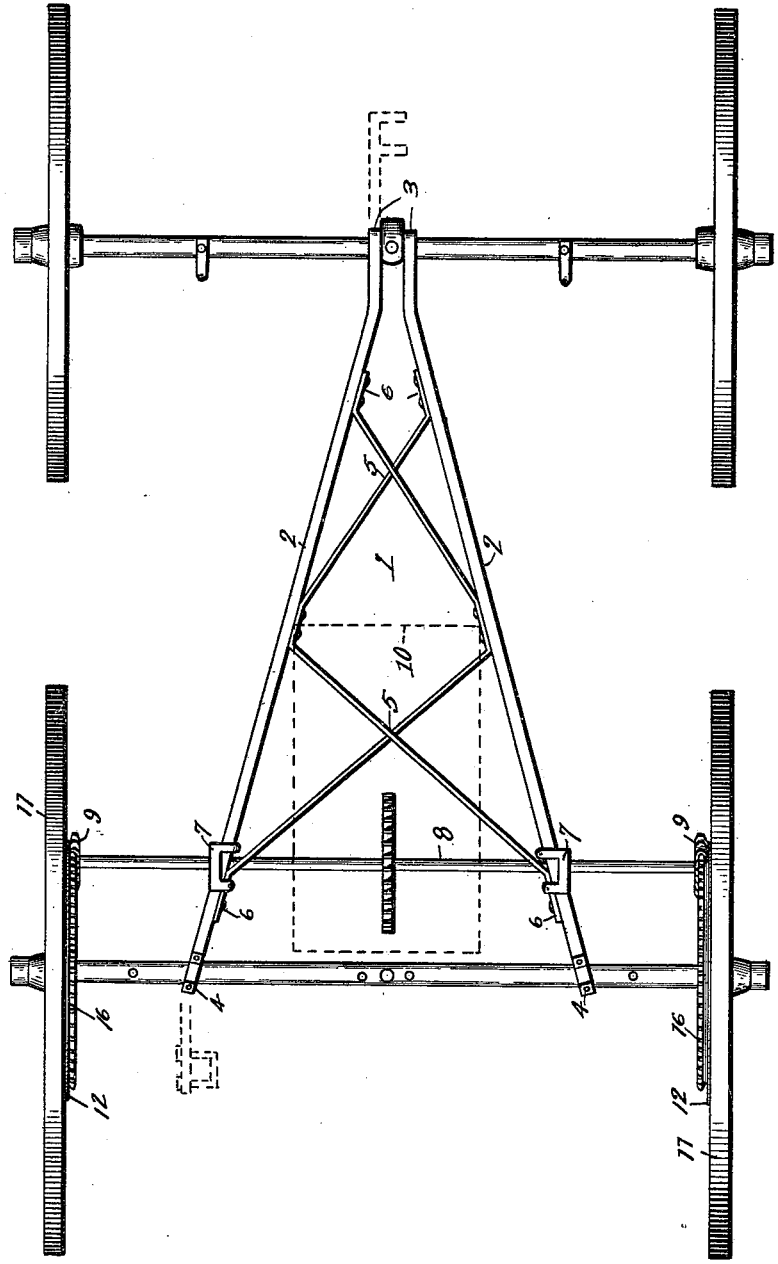

UNITED STATES PATENT OFFICE.

CASSIUS E. BELCHER, OF LINDEN, PENNSYLVANIA, ASSIGNOR OF ONE-HALF TO JOHN HENRY BOWERS, OF JERSEY SHORE, PENNSYLVANIA.

MOTOR-VEHICLE.

SPECIFICATION forming part of Letters Patent No. 650,816, dated June 5, 1900.

Application filed December 21, 1899. Serial No. 741,161. (No model.)

*To all whom it may concern:*

Be it known that I, CASSIUS E. BELCHER, a citizen of the United States, residing at Linden, in the county of Lycoming and State of Pennsylvania, have invented a new and useful Motor-Vehicle, of which the following is a specification.

My invention relates to an improvement in converted horseless or automobile carriages or other vehicles, the object of my invention being to provide devices by which an ordinary carriage or other vehicle adapted to be drawn by a horse or horses may be converted into an automobile or horseless vehicle at comparatively-slight expense.

To this end my invention consists in a power-applying wheel device adapted to be secured to the spokes of an ordinary vehicle-wheel and to receive power from a suitable motor or engine and communicate the same to the vehicle-wheel, thereby converting the latter into a driving-wheel for the carriage or other vehicle.

My invention further consists in a bridge or reach frame adapted to be secured on the running-gear of an ordinary vehicle and to support a suitable motor and mechanism for rotating the converted driving wheel or wheels of the vehicle.

My invention further consists in the peculiar construction and combination of devices hereinafter fully set forth, and particularly pointed out in the claims.

Figure 1:
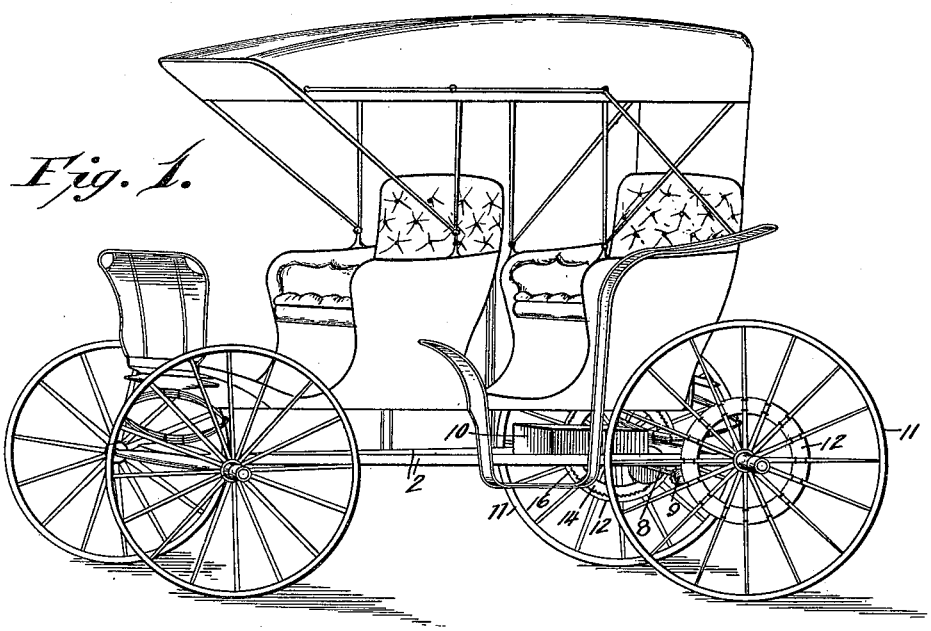
Figure 3:
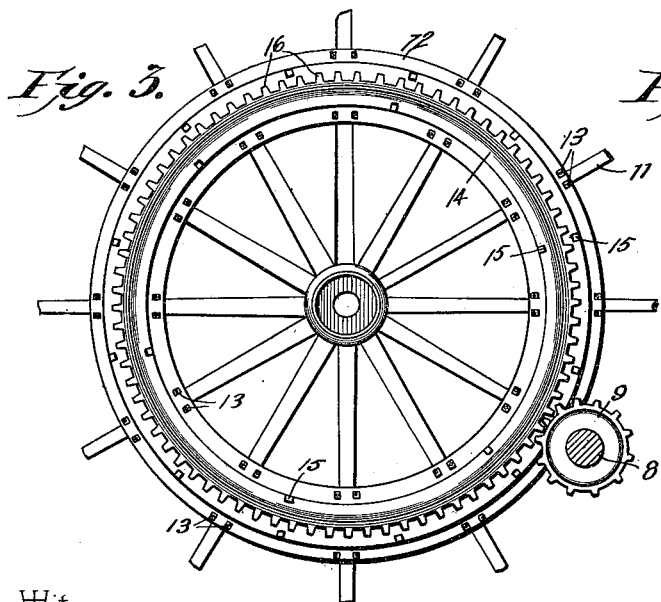
Figure 4:
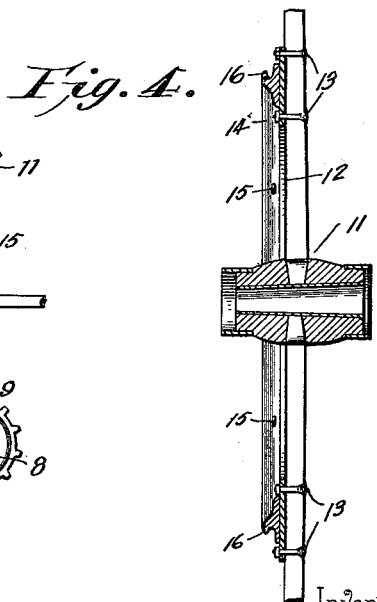

In the accompanying drawings, Figure 1 is a perspective view of an ordinary carriage converted into a horseless or automobile carriage by my improved devices. Fig. 2 is a top plan view of an ordinary vehicle running-gear provided with my improved converting devices. Fig. 3 is an elevation of my improved device for applying power to an ordinary vehicle-wheel, showing the same attached to the spokes of a wheel and engaged by a pinion on a power-shaft. Fig. 4 is a vertical sectional view of the same.

In the embodiment of my invention for converting an ordinary vehicle into a horseless or automobile vehicle I provide a bridge or reach frame 1, comprising the pair of rearwardly-diverging side-bars 2, preferably made of iron or steel, adapted to be connected to the king-bolt or fifth-wheel of the front axle or to the front bolster, as at 3, and provided at their rear ends with suitable clip-bolts 4, by which they may be secured to the rear axle or bolster. The said bars 2 are connected together substantially throughout their extent by crossed trusses 5, the ends of which are bolted to the said bars 2, as at 6. A reach or bridge frame thus constructed is exceedingly strong and is adapted to support a suitable motor or engine of any preferred form for actuating the vehicle. Moreover, said reach or bridge frame may be very readily attached to the running-gear of any ordinary vehicle, as will be readily understood.

A pair of bearings 7 are carried by the reach or bridge frame, in which bearings is mounted a power-shaft 8, adapted to be rotated by the motor or engine located on the bridge or reach frame. To one or both ends of the said shaft, which is of suitable length, is keyed a pinion, sprocket-wheel, or friction-gear 9, as may be preferred or required. Suitable levers or other means for controlling the speed and direction of motion of the motor will be provided, the same being of any suitable form and the same and the motor or engine forming no part of my present improvements and not being shown in the accompanying drawings, the motor or engine being merely indicated at 10, Figs. 1 and 2.

Secured on the inner side of the spokes of one or both of the rear vehicle-wheels 11 is an annular or ring plate 12, which is located concentrically on the vehicle-wheel and secured to the spokes thereof by clip-bolts 13. When applying one of the annular or ring plates to a wheel, the same should be clamped and centered with centering-braces upon the wheel and the holes in the ring or annular plate then marked and drilled for the clip-bolts, thus causing each clip-bolt to fit exactly in place and securely fastening the annular or ring plate to the spokes of the vehicle-wheel and in a perfectly-concentric position with respect to the center and rim of the wheel.

To the inner side of the annular or ring plate 12 and in a concentric position thereon is secured an annulus 14 by means of bolts 15, said annulus having a laterally-extended rim 16 on its inner side, provided with peripheral cogs, sprockets, or a friction-tread, the said cog, sprocket, or friction-annulus engaging with or being connected to the pinion, sprocket-wheel, or friction-gear 9 on the power-shaft 8.

It follows from the foregoing that the power from the motor will be applied to one or both of the rear vehicle-wheels by my improved converting devices, hence enabling an ordinary carriage or other vehicle to be readily converted into an automobile or horseless vehicle.

If necessary or desirable, the vehicle-wheels may be cut down or reduced in size when combining the same with my improved converting devices.

It will be understood by reference to the drawings that my power-applying devices will serve to effectually brace and greatly strengthen the spokes of the wheels to which they are bolted and adapt an ordinary vehicle-wheel perfectly to the purposes of an automobile driving-wheel.

While the motor is herein described and indicated as being located on the bridge-frame at a point between the front and rear axles of the vehicle, it is obvious that the bridge-frame may be provided with a rearward extension adapted to carry the motor behind the rear axle should it be desirable to so locate the motor, and I do not desire to limit myself in this particular.

Having thus described my invention, I claim—

1. The power-applying device for a converted automobile or horseless vehicle, comprising the flat annular ring adapted to be secured to the spokes of a vehicle-wheel, and the annulus 14, bolted to the inner side of said annular ring, said annulus having a laterally-extending rim on its inner side adapted for engagement with a power-gear, substantially as described.

2. Converting devices for a vehicle, comprising a bridge or reach frame, adapted to connect the front and rear axles or trunk of a vehicle, and having the side-bars 2, and bearings 7, in combination with a power-shaft, journaled in said bearings and having gears, an annular ring adapted to be secured to the spokes of the vehicle-wheel, and an annulus bolted to said annular ring, and having a laterally-extending rim on its inner side adapted for engagement with the gear on the power-shaft, substantially as described.

In testimony that I claim the foregoing as my own I have hereto affixed my signature in the presence of two witnesses.

C. E. BELCHER.

Witnesses:
 CHAS. FRIES,
 MATHEW EVERS.